United States Patent Office 3,423,383
Patented Jan. 21, 1969

3,423,383
METHOD OF REGULATING THE MOLECULAR WEIGHTS OF POLYDIOLEFINS
Hermann Winter and Heinrich Weber, Marl, Germany, assignors to Chemische Werke Hüls Aktiengesellschaft, Marl, Germany
No Drawing. Filed Apr. 30, 1964, Ser. No. 364,325
Claims priority, application Germany, June 6, 1963, C 30,123
U.S. Cl. 260—94.3   14 Claims
Int. Cl. C08d 1/14, 1/36

ABSTRACT OF THE DISCLOSURE

The use of esters to lower the molecular weight of polydiolefins produced on the basis of Ziegler-type catalysts.

---

This invention relates to a process for regulating the molecular weight of polydiolefins, more particularly by the use of an ester additive to a Ziegler-type catalyst system.

It is known that during the polymerization of diolefins in inert solvents with the help of Ziegler-type mixed catalysts composed of compounds of the transition metals on the one hand, and of metals, metal hydrides or organo-metallic compounds of the metals of the main Groups I to III of the Mendeleev Periodic Table on the other hand, it is possible to regulate the molecular weights of the resulting polydiolefins by the addition of hydrogen during the polymerization. It is also known that the molecular weight can be regulated by the addition of 1-olefins and nonconjugated diolefins. Finally, it is also possible within certain limits, to influence the molecular weight by changing the composition of the inert solvent, especially as to its content of aliphatic and aromatic hydrocarbons.

The molecular weights are thus, in fact, lowered by the addition of hydrogen, 1-olefins, nonconjugated diolefins and aliphatic components to the solvent mixture. All known methods, however, have their difficulties. In some cases there must be used either higher pressures or large amounts of the regulating compound. In other cases the regulating substances are difficult to obtain and are effective only within narrow limits of concentration which are difficult to maintain.

A principal object of this invention, therefore, is to provide an improved process for the regulation of the molecular weight of polydiolefins.

Upon further study of the specification and claims other objects and advantages of the present invention will become apparent.

To attain the objects of this invention, it has now been discovered that the molecular weights of polydiolefins which are produced by polymerization of diolefins with the help of mixed catalysts composed of compounds of cobalt on the one hand, and of metals, metal hydrides or metal-organic compounds of the metals of Groups I to III of the Mendeleev Periodic Table on the other hand, and in the optional presence of inert diluents, can be regulated by performing the polymerization in the presence of small amounts of esters.

Suitable esters for this purpose are the saturated and unsaturated aliphatic, cyclo-aliphatic and aromatic esters with one or more ester groups wherein the alcohol group as well as the acid group can be unsaturated.

In general the acidic portion of the ester is a hydrocarbon carboxylic acid containing not more than 25 carbon atoms, preferably not more than 18; and not more than 3 carboxyl groups, preferably not more than 2.

The alcohol portion of the ester, on the other hand, in general is a hydrocarbon alcohol containing not more than 12 carbon atoms, preferably not more than 7; and not more than 3 hydroxyl groups, preferably not more than 2.

Preferred esters, among others, are those of the following acids: formic, acetic, propionic, butyric, lauric, stearic, hexahydrobenzoic, benzoic, oxalic, succinic, phthalic, acrylic and oleic acid, combined with any of the following alcohols: methanol, ethanol, propanol, n-, iso- and tert.-butanol, 2-ethyl-hexanol, cyclohexanol, benzyl alcohol, vinyl alcohol, allyl alcohol, cinnamic alcohol, glycol, diethylene glycol, 1,4-butene-(2)-diol, p-dihydroxymethyl-benzene and glycerine. Examples of such esters are methyl formate, ethyl acetate, vinyl acetate, dimethyl-phthalate, vinyl benzoate, acrylic-acid-ethyl-ester, methacrylic-acid-methyl-ester and acrylic-acid-allyl-ester.

The esters are added in 0.01 to 100 molar amounts, preferably in 0.1 to 10 molar amounts relative to the amount of the transition element compound, the polymerization being even more preferably conducted with equi-molar amounts. In general, though, the amount of added ester usually depends on the desired amount of lowering of the molecular weight, the two amounts being usually proportional to each other. It is possible to regulate very successfully the molecular weights of polybutadienes with high 1,4-cis content, by means of esters with the help of mixed catalysts of cobalt compounds and aluminum-organic compounds.

Suitable diolefins are conjugated diolefins of not more than 6 carbon atoms, e.g., isoprene, pentadiene-(1,3) and especially butadiene-(1,3) as well as mixtures thereof with mono-olefins such as butene-(2).

As for the Ziegler-type catalysts, compounds of cobalt are especially useful, e.g., cobalt chloride and bromide, and possibly with compounds which in combination therewith form hydrocarbon soluble complexes such as alcohols or amines, and especially soluble cobalt compounds such as cobalt acetate, propionate, butyrate, octoate or stearate, or complex compounds of cobalt such as cobalt-acetyl-acetonate.

Preferred metals of main Groups I to III of the Mendeleev Periodic Table are sodium, lithium and aluminum, while preferred metal hydrides are sodium hydride, calcium hydride, aluminum hydride and lithium aluminum hydride. Preferred organometallic compounds are those which have metal-carbon bonds such as organometallic compounds of the alkali metals, e.g., amyl-sodium, butyl-lithium, Grignard compounds such as butyl-magnesium-bromide and phenyl-magnesium-bromide, and especially aluminum compounds such as aluminum trialkyls, aluminum triaryls and aluminum-triaralkyls such as trimethyl-aluminum, triethyl-aluminum, tri-isobutyl-aluminum and triphenyl-aluminum, also dialkyl-aluminum-monohalides, diaryl-aluminum-monohalides and diaralkyl-aluminum-monohalides as, e.g., diethyl-aluminum-monochloride, diphenyl-aluminum-monochloride, diethyl-phenyl-aluminum-monochloride and diethyl-aluminum-monobromide, and finally also the monoalkyl-aluminum dihalides, monoaryl-aluminum-dihalides and monoaralkyl-aluminum-dihalides such as monoethyl-aluminum-dichloride and mono-ethyl-aluminum-dibromide. Furthermore, dialkyl aluminum halides such as diethyl-aluminum-monohydride and diisobutyl-aluminum-monohydride have also been found valuable. Hydride-aluminum halides or their etherates, e.g., hydride aluminum chloride can also be advantageously used.

Preferred Ziegler-type mixed catalysts are drawn from any combination of compounds disclosed in the former paragraph with any compound in the latter paragraph. Particularly preferred mixed catalysts are:

Cobalt-(III)-acetyl-acetonate and ethyl-aluminum sesquichloride,

Cobalt-(III)-acetyl-acetonate and diethyl-aluminum monochloride,
Cobalt-(III)-acetyl-acetonate and hydride-aluminum chloride etherate.

The esters can be added to the polymerization mixture either at the beginning or during the polymerization with the components of the mixed catalyst added in any order. It is, however, advantageous to add the ester as a solution in an inert solvent to the mixed catalyst which is also preferably dissolved in the diluent of the polymerization mixture.

The polymerization is advantageously accomplished by introducing the diolefin or diolefin mixture into a 0.01 to 25%, preferably 0.1 to 5% solution or suspension of the mixed catalyst in an inert diluent. Suitable inert diluents are primarily the hydrocarbons, namely the aliphatic, cycloaliphatic and aromatic hydrocarbons such as butane, hexane, cyclohexane, isopropyl-cyclohexane, benzene and toluene, as well as mixtures of aliphatic and cycloaliphatic or aliphatic and aromatic hydrocarbons, e.g., gasoline fractions. Halongenated hydrocarbons such as carbon tetrachloride or chlorobenzene can also be used.

The polymerization can be performed either at atmospheric pressure or under super- or sub-atmospheric pressure. Ordinarily, however, it is not necessary to work under sub-atmospheric pressure. On the other hand, it is often advantageous to have the pressure increased by a few atmospheres.

The reaction can generally be performed at temperatures between −30 and 100° C., preferably between 0 and 50° C. During the reaction, the polymerization mixture is preferably agitated mechanically. The heat of polymerization is transferred away by cooling from within or from without, or by vaporization of a liquid. Polymerization is terminated in a known manner when the mixture is no longer capable of being readily agitated. During continuous operation the catalyst-containing solution is drawn off continually. The polymerization mixture is worked up in a known manner, e.g., by addition of an alcohol such as methanol or isopropanol and subsequent filtration. Of special interest is the use of water for reconditioning the material.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

Into a mixing vessel arrangement that is designed to prevent the introduction of air and moisture, there is introduced:

1 liter anhydrous benzene
108 g. (2 mols) butadiene containing:
    0.01% iso-butane
    0.01% n-butane
    0.1% butene-(1)- and iso-butene and
    0.05% trans-butene-(2)
    0.133 g. (1.51 mmols) ethyl acetate
    0.164 g. (0.46 mmol.) cobalt-(III)-acetyl-acetonate and
    2.48 g. (20 mmols) ethyl-aluminum sequichloride A vigorous polymerization begins which is maintained at between 20 and 25° C. by external cooling. After 5 hours the polymerization is terminated by adding acetone. The polybutadiene is precipitated by the dropwise addition of alcohol. The precipitated polymer is then washed and dried at 30° C. in a vacuum chamber. The yield is 100 g. of the polymer (93%) with an RV value (reduced viscosity), Macromolekulare Chemie 38, Seite 9 (1960), of 2.2, and with a 4% gel content of toluene-insoluble polybutadiene (at 25° C. and at a concentration of 0.20 g./cc.). According to infrared analysis, the polymer contains 97% 1,4-cis, 1% 1,4-trans and 2% 1,2-components.

Table I shows the relation of the RV value of the polybutadiene to the amount of added ethyl acetate.

TABLE I

| Ethyl acetate, g./Mol butadiene | Yield | RV | Gel | Structure (percent) | | |
|---|---|---|---|---|---|---|
| | | | | 1,2 | 1,4-trans | 1,4-cis |
| None | 80 | 5.2 | 3 | 1 | 1 | 98 |
| 0.006 | 83 | 4.3 | 4 | 1 | 1 | 98 |
| 0.033 | 85 | 3.7 | 3 | 1 | 1 | 98 |
| 0.066 | 90 | 2.2 | 3 | 2 | 1 | 97 |
| 0.020 | 93 | 1.5 | 2 | 2 | 2 | 96 |
| 0.333 | 25 | 0.75 | 3 | 2 | 3 | 95 |

EXAMPLE 2

Example 1 is repeated, but instead of ethyl acetate, 0.133 g. (1.22 mmols) ethyl acrylate is introduced. The yield is 98.6 g. polymer (95%) with an RV of 2.2 and a gel content of 1%. According to infra-red analysis the polymer contains 97% 1,4-cis, 1% 1,4-trans and 2% 1,2-polybutadiene.

Table II shows the relation of the RV values of the polybutadiene to the amount of added ethyl acrylate.

TABLE II

| Ethyl Acrylate, g./Mol Butadiene | Yield, percent | RV | Gel, percent | Structure (percent) | | |
|---|---|---|---|---|---|---|
| | | | | 1,2 | 1,4-trans | 1,4-cis |
| None | 80 | 5.2 | 3 | 1 | 1 | 98 |
| 0.006 | 82 | 3.9 | 1 | 1 | 1 | 98 |
| 0.020 | 88 | 3.1 | 1 | 1 | 1 | 98 |
| 0.033 | 90 | 2.6 | 2 | 1 | 1 | 98 |
| 0.066 | 95 | 2.2 | 1 | 2 | 1 | 97 |
| 0.200 | 95 | 0.89 | 2 | 3 | 2 | 95 |

EXAMPLE 3

Example 1 is repeated but instead of ethyl acetate 0.133 g. (1.54 mmols) vinyl acetate is used. The yield is 104.7 g. polymer (97% with an RV of 2.5 and a gel content of 0%).

According to infra-red analysis the polymer contains 97% 1,4-cis, 1% 1,4-trans and 2% 1,2-polybutadiene.

Table III shows the relation of the RV values of the polybutadiene to the amount of added vinyl acetate.

TABLE III

| Vinyl acetate, g./Mol Butadiene | Yield, percent | RV | Gel, percent | Structure (percent) | | |
|---|---|---|---|---|---|---|
| | | | | 1,2 | 1,4-trans | 1,4-cis |
| | 80 | 5.2 | 3 | 1 | 1 | 98 |
| 0.006 | 87 | 4.1 | 1 | 1 | 1 | 98 |
| 0.020 | 97 | 2.9 | 1 | 1 | 1 | 98 |
| 0.033 | 93 | 2.7 | 4 | 2 | 1 | 97 |
| 0.066 | 97 | 2.5 | 0 | 2 | 1 | 97 |
| 0.200 | 98 | 0.84 | 5 | 2 | 2 | 96 |

EXAMPLE 4

Example 1 is repeated, but instead of ethyl acetate, 0.04 g. (0.067 mmol) ethylene-glycol distearate is used. The yield is 102 g. polymer (95%) with an RV value of 2.9 and a gel content of 0%. According to infra-red analysis the polymer contains 98% 1,4-cis, 1% trans- and 1% 1,2-polybutadiene.

If 0.133 g. (0.224 mmol) ethylene-glycol-distearate is used, a polymer with an RV of 2.3 and a gel content of 0% is obtained.

EXAMPLE 5

The work is done as in Example 1, but instead of ethyl acetate, 0.04 g. (0.121 mmol) dicyclohexyl-phthalate is used. The yield is 100 g. polymers (93%) with an RV of 2.7 and a gel content of 2%. According to infra-red analysis the polymer contains 98% 1,4-cis, 1% 1,4-trans, and 1% 1,2-polybutadiene.

If 0.133 g. (0.4 mmol) dicyclohexyl-phthalate is used, a polymer with an RV of 2.1 and a 3% gel content is obtained.

EXAMPLE 6

The work is done as in Example 1, but instead of ethyl acetate, 0.04 g. (0.236 mmol) diallyl oxalate is used. The yield is 97.5 g. polymer (90%) with an RV of 3.0 and a gel content of 0%. According to infra-red analysis the polymer contains 98% 1,4-cis, 1% trans and 1% 1,2-polybutadiene.

If 0.133 g. (0.78 mmol) diallyl oxalate is used, a polymer with an RV of 2.4 and a 0% gel content is obtained.

The preceding examples can be repeated but substituting the other generically and specifically disclosed Ziegler-type catalysts of this invention, thereby obtaining similar results. Likewise, the other esters of this invention can be used with any of the diolefins and Ziegler-type catalysts with similar success in regulating the molecular weight of the polymer.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

We claim:

1. In a process for the polymerization of conjugated diolefins of up to 6 carbon atoms in the presence of a Ziegler-type catalyst having a cobalt compound as the transition metal compound, resulting in polymers having undesirably high molecular weights, the improvement of obtaining lower molecular weight polymers, which comprises incorporating, with said Ziegler-type catalyst, an ester of a hydrocarbon carboxylic acid of not more than 25 carbon atoms and 3 carboxyl groups, and the alcohol portion of said ester being a hydrocarbon alcohol of not more than 12 carbon atoms and not more than 3 hydroxyl groups, the amount of added ester being 0.01–100 times the molar amount of cobalt compound and being substantially proportional to the degree of the lowering of the molecular weight of the resultant polymer as compared with the molecular weight of a polymer produced under the same conditions but without any ester.

2. A process as defined by claim 1 wherein said cobalt compound is soluble.

3. A process as defined by claim 1 wherein the ester is selected from the group consisting of esters of the following acids: formic, acetic, propionic, butyric, lauric, stearic, hexahydrobenzoic, benzoic, oxalic, succinic, phthalic, acrylic, and oleic acid, combined with any of the following alcohols: methanol, ethanol, propanol, n-, iso-, and tert.-butanol, 2-ethyl-hexanol, cyclohexanol, benzyl alcohol, vinyl alcohol, allyl alcohol, cinnamic alcohol, glycol, diethylene glycol, 1,4-butene-(2)-diol, p-dihydroxymethyl-benzene, and glycerine.

4. A process as defined by claim 1 wherein the ester is selected from the group consisting of ethyl acetate, ethyl acrylate, vinyl acetate, ethylene glycol distearate, dicyclohexyl phthalate, and diallyl oxalate.

5. A process as defined by claim 1 wherein the Ziegler-type catalyst consists essentially of said cobalt compound and a member selected from the group consisting of ethyl aluminum sesquichloride, diethyl aluminum monochloride, and hydride-aluminum chloride etherate.

6. A process as defined by claim 5 wherein said cobalt compound is soluble.

7. A process as defined by claim 1 wherein the conjugated diolefin is butadiene.

8. A process as defined by claim 2 wherein the conjugated diolefin is butadiene.

9. A process as defined by claim 3 wherein the conjugated diolefin is butadiene.

10. A process as defined by claim 4 wherein the conjugated diolefin is butadiene.

11. A process as defined by claim 5 wherein the conjugated diolefin is butadiene.

12. A process as defined by claim 6 wherein the conjugated diolefin is butadiene.

13. A process as defined by claim 6 wherein said ester is selected from the group consisting of esters of the following acids: formic, acetic, propionic, butyric, lauric, stearic, hexahydrobenzoic, benzoic, oxalic, succinic, phthalic, acrylic, and oleic acid, combined with any of the following alcohols: methanol, ethanol, propanol, n-, iso-, and tert.-butanol, 2-ethyl-hexanol, cyclohexanol, benzyl alcohol, vinyl alcohol, allyl alcohol, cinnamic alcohol, glycol, diethylene glycol, 1,4-butene-(2)-diol, p-dihydroxymethyl-benzene, and glycerine.

14. A process as defined by claim 6 wherein said ester is selected from the group consisting of ethyl acetate, ethyl acrylate, vinyl acetate, ethylene glycol distearate, dicyclohexyl phthalate, and diallyl oxalate.

References Cited

UNITED STATES PATENTS 3,149,097   9/1964   Coover et al. _____ 260—93.7

OTHER REFERENCES

Linear and Stereoregular Addition Polymers, Gaylord and Marr, 1959, Interscience Publishers Inc., New York and London (pp. 90–106 relied on).

JOSEPH L. SCHOFER, *Primary Examiner.*

R. A. GAITHER, *Assistant Examiner.*